United States Patent Office 3,072,347
Patented Jan. 8, 1963

3,072,347
METAL PROCESSING
Henry S. Dombrowski, Wilmington, Del., assignor to E. I. du Pont de Nemours and Company, Wilmington, Del., a corporation of Delaware
No Drawing. Filed Nov. 2, 1961, Ser. No. 149,506
4 Claims. (Cl. 241—3)

This invention pertains to the production of metal powders. More particularly, it pertains to the comminution of refractory metals.

Many of the refractory metals such as titanium, zirconium, hafnium, columbium, tantalum, and chromium are obtained by the chemical reduction of their compounds, especially chlorides, and are formed as porous spongelike deposits or masses of intermeshed crystals. In order to use these masses of porous metal, they are reduced in size by cutting, milling, and other grinding operations. In the case of titanium, the sponge, containing a by-product salt, is subdivided to coarse granules, and then the mixture is run through a comminuting mill such as a hammer mill to reduce the metal to a powder ranging from just below 14 to below 200 meshes to the inch. The metal is then leached to remove the salt and dried to form a granular product. This product may be consolidated by melting and casting, or it may be used in various powder metallurgical operations if its quality permits.

These refractory metals are now produced in quite pure form and as a result they are ductile. They are strong metals and exhibit a high degree of toughness, making them difficult to reduce to a small particle size. There is a tendency for these ductile metals to smear and clog equipment used for particle size reductions. Furthermore, there appears to be a tendency for the salt by-product of the reduction reaction to be entrapped in the metal in such a way that previous methods of grinding do not expose it to the leaching solution. Perhaps there is also some tendency for the ductile metal to close over small pockets of salt during grinding. Although the amount of this salt is small, about 0.1%, it nevertheless seriously interferes with later metal working operations and metal properties. The titanium metal sponge produced by magnesium reduction of titanium tetrachloride has proved especially difficult to pulverize.

An object of this invention is to improve the comminution of refractory metals.

A further object is to provide a cutting or comminuting method which will provide a metal powder in the size ranges below 14 mesh, and preferably below 30 mesh, and having the desired powder metallurgical properties such as good green strength, and satisfactory softness.

Another object is to treat the primary refractory metal sponge or crystalline mass so that the desired comminution can be obtained by use of commercially available equipment.

Still another object is to release small amounts of impurities in the metal or to avoid entrapment of them during comminution.

These objects and others are achieved by a process which comprises embedding a metal in either water ice or solid $CO_2$ ("Dry Ice"), and maintaining the ice matrix in substantially solid condition while subjecting the embedded metal and the matrix to comminution by mechanical cutting action. Metals which may be treated according to this invention include titanium, zirconium, hafnium, columbium, tantalum, and chromium.

In a preferred embodiment, the metal sponge may be subdivided into coarse granules of about ¼ to ¾ inch diameter and immersed in water. The water, which has penetrated the pores of the metal and surrounded the grains, is then frozen by cooling. Additional cooling to temperatures substantially below the melting point of ice, preferably below about −30° C., helps keep the ice from appreciably melting during comminution. The block of ice containing the embedded metal is cut or crushed into coarse granular form and then both the metal and the ice are comminuted by the shearing action of a cutting tool in a zone which is maintained below the melting point of ice, preferably below 0° C. Several passes through the mill or successive mills may be used. The ground material is then thawed and the metal powder recovered. Alternatively, the crushed ice-metal mixture may be mixed with solid $CO_2$ to provide the desired low temperature and prevent thawing of the ice due to pressure and work in the mill. The three-component mixture (ice, solid $CO_2$, and metal) is passed through a cutting mill. After comminution, the ice is allowed to melt, whereupon it leaches away any salt or other impurities exposed by the cutting operation.

When using "Dry Ice" per se, the particles of metal are easily embedded by flowing liquid $CO_2$ from a tank into an open container holding the metal. The $CO_2$ freezes by its own evaporation and forms a solid matrix of $CO_2$ in which the metal is embedded. The block of $CO_2$ and metal thus formed may then be subjected to cutting action, for example, in an ice shaver. Alternatively, the cake may be broken up before the cutting action is used to cut the metal and the embedding "Dry Ice" into small pieces. The use of "Dry Ice" offers the advantage of comminuting and recovering the metal in the dry state.

In another embodiment designed to adapt the process to continuous commercial operation and to economize on the amount of cooling agent required, the metal sponge may be submerged in water in a vessel or mold and frozen to a slab or bar. This bar may be further cooled by refrigeration, or contact with Dry Ice, or by immersion in a Dry Ice-alcohol bath or similar cooling medium. Cooling of the slab is, of course, easier if it is relatively thin; e.g., ½ to 2 inches in thickness. The cold slab is then fed, preferably through a chute or guide, to a cutting unit which takes chips, turnings, or shavings from the end of the slab as it is fed into the unit. The chute and some machine parts are preferably jacketed and cooled with a cooling fluid.

More thorough embedding and complete contact between the metal and the water ice may be obtained by subjecting the mixture of liquid water and metal to reduced pressure to remove entrapped air.

For a clearer understanding of the invention, the following specific examples are given. These examples are intended to be merely illustrative of the invention and not in limitation thereof. Unless otherwise specified, all parts are by weight. Sieve sizes in this specification are in terms of the U.S. Standard Screen Scale.

*Example I*

25 lbs. of titanium sponge prepared by reacting $TiCl_4$ with molten magnesium followed by draining of molten by-product salt and vacuum distillation of the volatile residues was prepared in the form of approximately ½ inch lumps on a coarse milling machine. The lumps were covered with water in a plastic bucket and left in a freezer about 48 hours. The resulting solid cake was broken up with a hammer and sharp wedge and run through a cold jaw crusher. The discharge from the jaw crusher was mixed with about twice its weight of granular Dry Ice to cool it to about −65° C. A rotary knife cutter was set up and cooled by passing Dry Ice through it. This cutter was similar in operating principle and structure to that shown in FIGURE 62, page 1161, of Perry's "Chemical Engineers' Handbook," 3d edition. It was, however, equipped with a single bed knife and 15 fly knives. The whole assembly was of heavy construction, and the knife edges were serrated. The mixture of Dry Ice and water ice having metal embedded therein was fed through this cutter. More Dry Ice was added to the product and again passed through the mill. After three such passes, the charge was allowed to warm and the wet metal powder was leached with weak (½%) nitric acid solution washed and dried. The metal powder was sieved. The properties and characteristics of each fraction are listed below:

| Starting Material | | Percent Cl | BHN [1] | G.S.,[2] p.s.i. |
| --- | --- | --- | --- | --- |
| Size | Distribution | | | |
| −1/2 in. | 100% | 0.05 | 90 | |
| Powdered Product | | | | |
| +14 mesh | 20 | .05 | 100 | 800 |
| −14+30 mesh | 25 | .04 | 95 | 1,000 |
| −30+60 mesh | 33 | .01 | 100 | 1,800 |
| −60+200 mesh | 18 | .01 | 110 | 1,900 |
| −200 mesh | 4 | .02 | 115 | 1,600 |

[1] BHN=Brinell Hardness Number measured on a vacuum arc melted button of the material.
[2] G.S.=Green Strength which is the tensile strength in p.s.i. of a strip formed by compacting the powder under specified conditions and determining the bend tensile strength of the compact. The specification for this test is found under ASTM Designation: B 312-58T.

*Example II*

Titanium sponge similar to that used in Example I was milled to coarse grains about ¼ inch in diameter. These grains were used to fill a long shallow pan 2 ft. x 2 inches wide x ¾ in. deep. Water was added to cover the sponge and the mixture frozen and further cooled in a Dry Ice chest to about −70° C. A heavy duty cutting mill having rotary cutting blades was fitted with a special guide chute comprising an elongated metal conduit through which the frozen strip could be fed to the blades. This guide supported the frozen strip up to within about 1/32 inch of the path of the knife edges. The mill and chute were cooled by packing in Dry Ice. The frozen strip was removed from the freezer and quickly fed end-wise through the chute to the rotating blades which consumed the strip with a chipping and shaving action operating at nearly right angles to its long axis. The pulverized mixture of ice and metal was warmed to melt the ice, returned to the casting pan, refrozen, and cooled to about −60° C. It was then given a second pass through the mill. The resulting titanium powder, after recovery from the ice, leaching in dilute nitric acid, rinsing and drying, was found to be mostly below 14 mesh in size and a major part was below 30 mesh. The powder was well suited for compaction and use in powder metallurgical processes.

As previously mentioned, metal sponges, especially titanium, produced by the magnesium reduction of the metal chloride are particularly difficult to reduce to a powder in conventional prior art processes for reducing particles size. If the lumps of sponge, such as are used in the above examples, but without the benefit of the ice matrix, are fed to a cutting mill, the mill is quickly jammed by the metal. Use of hammer mill and other impact-producing devices beats the ductile metal into rather coarse particles like BB shot.

The marked success of this invention seems to be due to the fact that the metal is tightly embedded in the solid matrix as it is subjected to the cutting action of the mills. Experiments have shown that feeding of a loose mixture of metal with ice and/or Dry Ice is not successful. Various procedures for embedding the metal in the ice may be used. Large portions of the sponge may be immersed and frozen but preferably the initial sponge is broken or milled into small lumps so that smaller units are frozen, thus improving the heat transfer conditions during freezing and further cooling. Freezing of metal lumps within ice cubes of a size such as is obtained in a home refrigerator is satisfactory. Flat sections or strips, even continuously formed strips, having one rather small dimension will speed the cooling operation. Then, when these flat pieces are fed edgewise or end-first, the cutting action of the mill is improved. The product from the mill may be reground directly before thawing or evaporation of the ice phase, or it may be recast into an ice cake before further passes through a mill until the desired size reduction is achieved, e.g., a major portion is reduced to −30 mesh. This procedure of repeating the embedding and comminuting steps is especially useful in obtaining fine metal powders, such as those of 325 mesh and below.

In general, the mills used must effect a sharp-edged or pointed cutting action on the embedded metal. Speed of the edge is not critical or important except as it effects the production rate. Many mills of the suitable type have the cutting tools mounted on a rotating member located in a housing to which the ice-embedded metal is fed. The feed hopper, chute, guide and housing clearance are preferably arranged so that the ice is held against the action of the cutters, at least for a portion of the grinding period. Several commercial types are described in Perry's Chemical Engineer's Handbook, 3d Edition, pages 1160 to 1164, under the titles: "Rotary Knife Cutters," "Filing Machines," "Saws," "Shaving Machines," "Milling Machines," and "Turning."

The process of this invention affords a method for comminuting metals, especially sponge metal products resulting from the active metal reduction of the refractory metal chlorides, in such a way that the resulting metal powder has improved powder metallurgical characteristics not found in powder ground by previous methods. Furthermore, the method of this invention has the ability to decrease the impurity content of the metal by freeing residual trapped by-product salts.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for comminuting metals which comprises embedding refractory metal in a solid matrix selected from the group consisting of ice and solid $CO_2$, subjecting the embedded metal and the matrix to mechanical cutting action to reduce the particle size of said metal, and during said cutting maintaining the embedding matrix substantially in the solid state.

2. A process for comminuting a refractory metal resulting from the chemical reduction of a refractory metal chloride which comprises preparing the refractory metal in the form of lumps not greater than about ¾ inch in diameter, submerging the metal lumps in water, freezing said water, further cooling the resulting ice-metal cake to temperatures substantially below the melting point of the ice, and subjecting the thus-embedded metal along with the ice matrix to comminution in a cutting mill wherein the temperature of the cutting zone is maintained substantially below the melting point of ice.

3. A process for producing a metallurgical refractory metal powder from a refractory metal sponge produced by the magnesium reduction of a refractory metal chloride which comprises forming small lumps of said sponge, immersing the lumps in water, freezing the water surrounding said lumps to solid ice, breaking the metal-ice mixture into lumps, mixing the metal-ice lumps with lumps of solid carbon dioxide to reduce the temperature thereof to approximately the temperature of the solid carbon dioxide, subjecting the resulting mixture to at least one pass through a cutting mill, said solid carbon dioxide being used in sufficient quantity that at least a portion of the carbon dioxide remains in the solid state as the mixture is discharged from said mill, thawing the ice in the milled product and recovering the metal powder product.

4. A process for producing a metallurgical titanium powder which comprises subdividing titanium sponge metal, obtained by the reduction of titanium tetrachloride with molten magnesium, into lumps no greater than about ¾ inch in diameter, submerging these lumps in water, and freezing said water to embed the metal in a slab of solid ice, cooling said slab to a temperature substantially below the melting point of ice, feeding said cold slab through a cutting mill maintained at temperatures substantially below 0° C., thawing the pulverized product, refreezing said product into a slab to re-embed the metal particles therein, again passing the slab through a cooled cutting mill, continuing the above cyclic process until a major portion of the metal has been reduced in size to −30 mesh, and recovering the titanium from the ice in powder form.

References Cited in the file of this patent

UNITED STATES PATENTS

| | | |
|---|---|---|
| 2,575,509 | Boyston | Nov. 20, 1951 |
| 2,609,150 | Bludeau | Sept. 2, 1952 |
| 2,879,005 | Jarvis | Mar. 24, 1959 |
| 2,892,697 | Davies | June 30, 1959 |
| 2,919,862 | Beike | Jan. 5, 1960 |